United States Patent [19]
Barron

[11] Patent Number: 5,748,102
[45] Date of Patent: May 5, 1998

[54] APPARATUS FOR INTERCONNECTING AN UNDERWATER VEHICLE AND A FREE FLOATING COMMUNICATIONS POD

[75] Inventor: Thomas D. Barron, Portsmouth, R.I.

[73] Assignee: The United States of America as represented by the Secretary of the Navy, Washington, D.C.

[21] Appl. No.: 530,394

[22] Filed: Sep. 19, 1995

[51] Int. Cl.$^6$ ........................................... H04B 13/02
[52] U.S. Cl. .................... 340/850; 114/312; 114/328; 114/21.1
[58] Field of Search ................... 340/850; 114/312, 114/328, 21.1

[56] References Cited

U.S. PATENT DOCUMENTS

| 5,291,194 | 3/1994 | Ames | 340/850 |
| 5,349,916 | 9/1994 | Hillenbrand et al. | 114/312 |
| 5,396,859 | 3/1995 | Hillenbrand et al. | 114/312 |

Primary Examiner—J. Woodrow Eldred
Attorney, Agent, or Firm—Michael J. McGowan; Prithvi C. Lall; Michael F. Oglo

[57] ABSTRACT

Apparatus for interconnecting an unmanned underwater vehicle and a free-floating communications pod includes a communications cable depending from the pod and extending to a buoy of less buoyancy than the pod, such that the cable carries communication signals between the pod and the buoy and extends generally vertically in a column of water between the pod and the buoy, the buoy being in communication with a distal station. The apparatus further includes a mobile unmanned underwater vehicle having therein guidance means for directing the vehicle to the cable, the vehicle being in communication with a control vessel, connector means mounted in a nose portion of the vehicle and adapted to intercept the cable, the connector means being further adapted to permit the cable to slide therethrough as the vehicle continues movement after the intercept of the cable, and complementary alignment means on the vehicle and the pod adapted to cause the vehicle to engage the pod in a preselected orientation and azimuth, with the communication components of the UUV and pod in alignment, whereby to place the control vessel in communication with the distal station.

18 Claims, 4 Drawing Sheets

APPARATUS FOR INTERCONNECTING AN UNDERWATER VEHICLE AND A FREE FLOATING COMMUNICATIONS POD

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

This invention relates to apparatus for interconnecting of two submerged bodies and is directed more particularly to such apparatus as will automatically align the two bodies upon interconnection to facilitate establishment of communication between the two bodies.

(2) Description of the Prior Art

The underwater connection of two bodies may be required to establish communication between the two bodies in situations in which covertness and/or high data rate transmission is required. Such connections are required, for example, between submarines and underwater vehicles, such as torpedoes.

In an illustrative system, an unmanned undersea vehicle (UUV) is provided with a communication line extending to a control vessel, typically a submarine. A controlled body, typically a weapon, such as a torpedo, is deployed in water and has extending therefrom a communication line connected at a remote end to a submerged free-floating buoy. The buoy is connected by a communication cable to a free-floating pod of greater buoyancy than the buoy. Thus, the pod floats above the buoy with the communication cable disposed in a water column generally vertically therebetween. In operation, the UUV is maneuvered into contact with the vertical cable between the buoy and the pod. Communication is established between the UUV and the pod which effects communication between the submarine and the torpedo. Accordingly, from a relatively safe distance the submarine may send instructions to the torpedo.

While in some communication systems, it is acceptable for the UUV merely to be proximate the pod, in fiber-optic and free space laser communications, particularly where multiple spatially separated channels are involved, engagement and highly accurate alignment of the UUV and the pod are required. In such instances, only a single orientation of the UUV relative to the pod is acceptable.

More particularly, the single orientation includes azimuthal orientation of the UUV relative to the pod. Positioning underwater bodies for their interconnection with azimuthal accuracy has heretofore required extensive human interaction and has been difficult, at best, in view of local currents and sea conditions.

In U.S. Pat. No. 5,291,194, issued Mar. 1, 1994, to Gregory H. Ames there is disclosed an apparatus for interconnecting an unmanned underwater vehicle (UUV) and a free-floating pod. The apparatus comprises a communications cable extending between the pod and a less buoyant buoy, the buoy being in communication with a distal station, a mobile UUV in communication with a control vessel, connector structure on the UUV adapted to intercept the cable and adapted to slide along the cable toward the pod, and complementary engagement structure on the UUV and the pod adapted to cause the UUV to engage the pod in a preselected orientation and azimuth, to place the control vessel in communication with the distal station.

To facilitate intercept of the cable by the UUV, the UUV is provided with a pair of arms, each extending from a side of the UUV. An arm engages the cable and causes the cable to slide along the engaged arm and into a receiving slot in a cone-shaped recess in the UUV. As the UUV continues travelling forwardly, the cable is caused to slide axially through the slot in the recess until a cone-shaped pod is engaged by the UUV, the pod being guided into the UUV cone-shaped recess with appropriate azimuthal alignment with the recess.

While the '194 apparatus effects a suitable interconnection of pod and UUV, the intercept means, i.e., the arms on either side of the UUV, are relatively expensive and the UUV must be provided with two conical recesses and two sets of connectors, one for each arm.

In U.S. Pat. No. 5,349,916, issued Sep. 27, 1994, in the names of Christopher F. Hillenbrand, Thomas D. Barron, et al, there is disclosed an undersea vehicle having a nose mounted capturing block which features two arms defining a funnel-like entrance into the block. However, the capture structure has no means for angular orientation of the captured body in the capture structure.

It would be beneficial to have available a UUV with a single cable intercept means, including a single conical recess, and single connector having means for properly orienting the pod azimuthally in the UUV recess.

SUMMARY OF THE INVENTION

It is accordingly an object of the invention to provide apparatus for interconnecting underwater bodies, such as a UUV and a communications pod, the apparatus including a UUV adapted to automatically engage a generally vertical cable suspended in a water column.

A further object of the invention is to provide such apparatus in which the UUV is adapted, after engagement with the cable, to ride along the cable into engagement with the pod.

A further object of the invention is to provide such apparatus in which the UUV and the pod are adapted to automatically engage each other in a manner facilitating correct alignment of the two bodies so as to provide precise alignment of communication components.

A still further object of the invention is to provide such apparatus wherein the UUV is provided with a single cable intercept means disposed in the nose of the UUV, including a single recess and connector means for receiving the pod.

With the above and other objects if view, as will hereinafter appear, a feature of the present invention is the provision of apparatus for interconnecting an unmanned underwater vehicle and a free-floating communication cable depending from the pod and extending to a buoy of less buoyancy than the pod, such that the cable extends generally vertically in a column of water between the pod and the buoy, the buoy being in communication with a distal station, the mobile unmanned underwater vehicle having therein guidance means for directing the vehicle to the cable, the vehicle being in communication with a control vessel, connector means mounted in a nose portion of the vehicle and adapted to intercept the cable when the nose of the UUV is pointed at the cable the connector means being further adapted to permit the cable to slide therethrough as the vehicle continues movement after the intercept of the cable, and complementary alignment means on the vehicle and the pod adapted to cause the vehicle to engage the pod in a predetermined vertical and azimuthal orientation, with the communication components of the UUV and pod in registry, whereby to place the control vessel in communication with the distal station.

The above and other features of the invention, including various novel details of construction and combination of parts, will now be more particularly described with reference to the accompanying drawings and pointed out in the claims. It will be understood that the particular apparatus embodying the invention is shown by way of illustration only and not as a limitation of the invention. The principles and feature of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
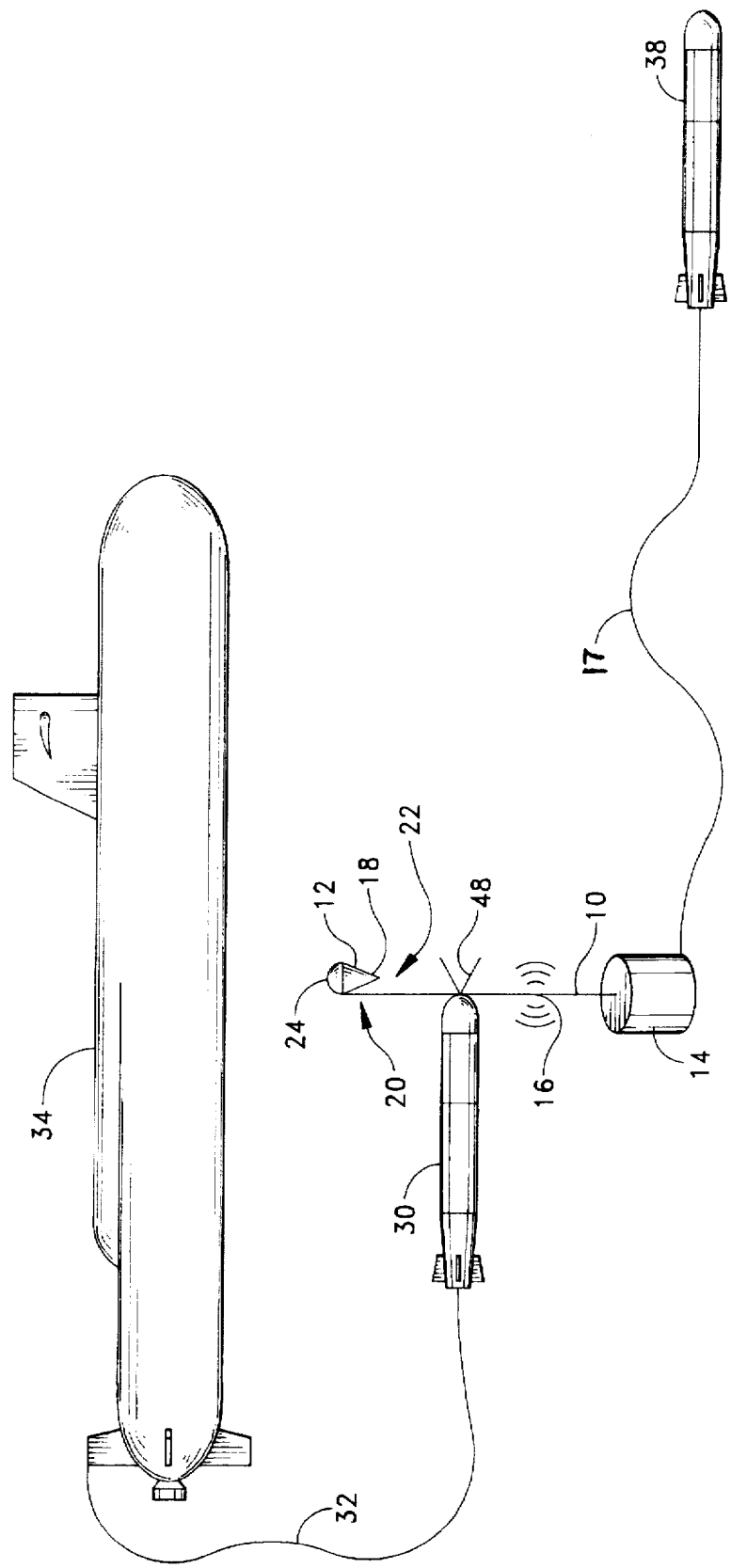
FIG. 1 is a diagrammatic presentation of apparatus illustrative of an embodiment of the invention.

Referring to FIG. 1, it will be seen that an illustrative apparatus includes a communication cable 10, which may, for example, be a fiber-optic cable. Cable 10 is connected at a first end thereof to a free-floating communication pod 12 and at a second end thereof to a buoy 14 of less buoyancy than the pod. The buoy is in communication, as by a distal line and communication cable 17, with a distal station, typically a weapon, such as a torpedo. Pod 12, being more buoyant than buoy 14, floats above the buoy, causing the cable 10 to be generally vertical in attitude. The buoy 14 is typically also free-floating, but in shallow water applications may be bottom-stationed. In the cable 10, there is disposed an acoustic beacon 16 adapted to signal omnidirectionally.

Pod 12 includes a hull portion 18 which is conically shaped. Cable 10 is fixed to hull portion 18 of pod 12 at a connection point 20 close to, but spaced from, a central point 22 at the cone-shaped hull portion 18. The pod 12 is provided with a stationary rudder 24 fixed to the upper surface of the pod.

The system includes a mobile unmanned underwater vehicle (UUV) 30. The UUV 30 is provided with apparatus (not shown) adapted to detect and "home" on the signal of acoustic beacon 16, in both azimuth and depth with the nose of the UUV pointed substantially at the beacon. Homing devices of this general type are known and have been used extensively in mobile underwater vehicles, such as homing torpedoes.

The UUV 30 is connected by a proximal cable 32, corresponding in type to cable 10, that is, a fiber-optic cable if the cable 10 is a fiber-optic cable, to a control vessel 34, typically a submarine. Similarly, the buoy 14 is connected by distal line and cable 170 of the same type as cables 10 and 32, to a distal. station 38 which may be a torpedo, as shown in FIG. 1, or may be another selected station, such as a surface transceiver, a UUV other than a torpedo, another submarine, or an underwater communication network.

Figure 2:
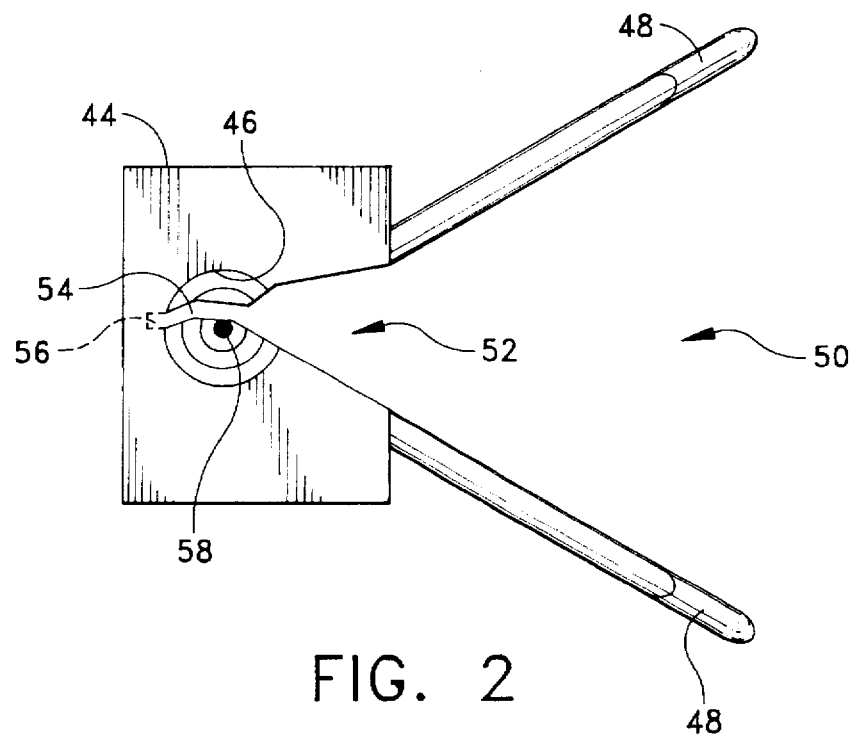
FIG. 2 is a top plan view of a connector means mounted on the nose portion of the UUV.
Figure 3:
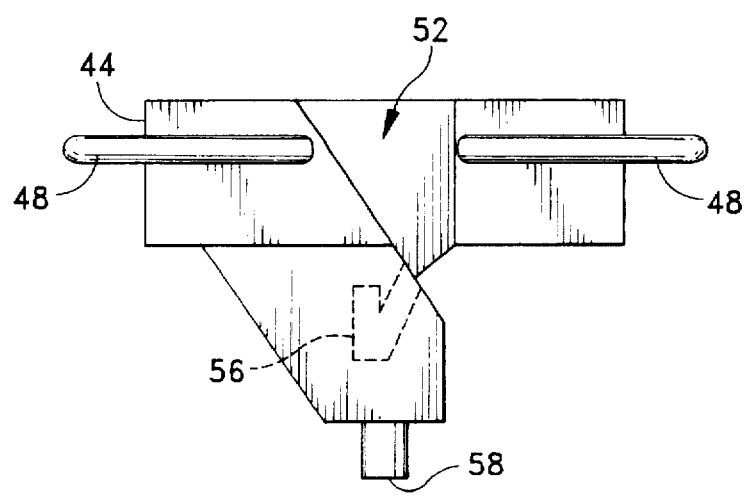
FIG. 3 is a front elevational view of the connector means of FIG. 2.
Figure 4:
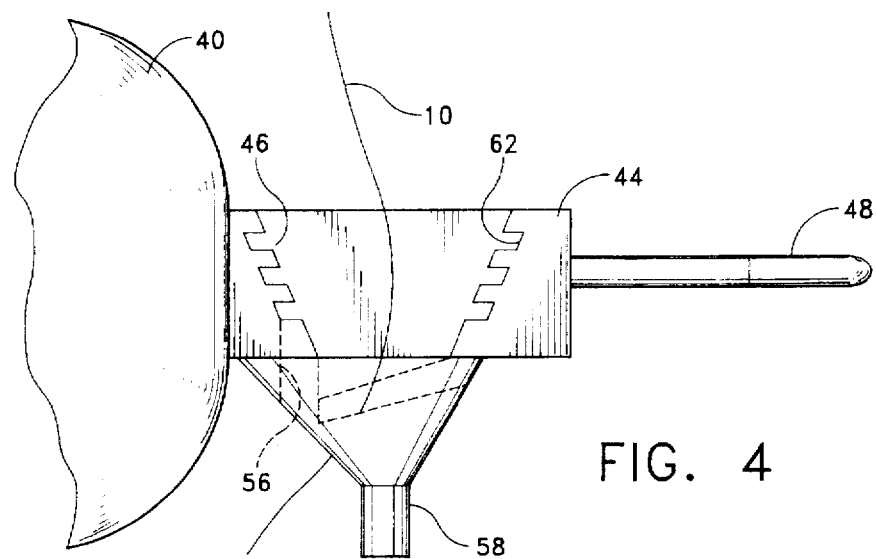
FIG. 4 is a side elevational view of the nose portion of the UUV, the connector means thereon, and a fiber-optic cable shown intercepted by the connector means.

The UUV 30 has mounted on a nose portion 40 thereof (FIG. 4) a connector means 42 comprising a capture box 44 having therein a generally conically--shaped recess 46, configured complementarily to the pod hull portion 18. A pair of arms 48 extend forwardly from the box 44 to define a funnel-like opening 50 therebetween (FIG. 2). The box 44 is provided with an opening 52 for receiving the cable 10. Extending from the opening 52 is a slot 54 in communication with a cable feed-through channel 56. At the apex of the recess 46 is fixed a fiber-optic connector 58 which is in communication with the proximal cable 32 and, thereby, the control vessel 34.

Figure 5:
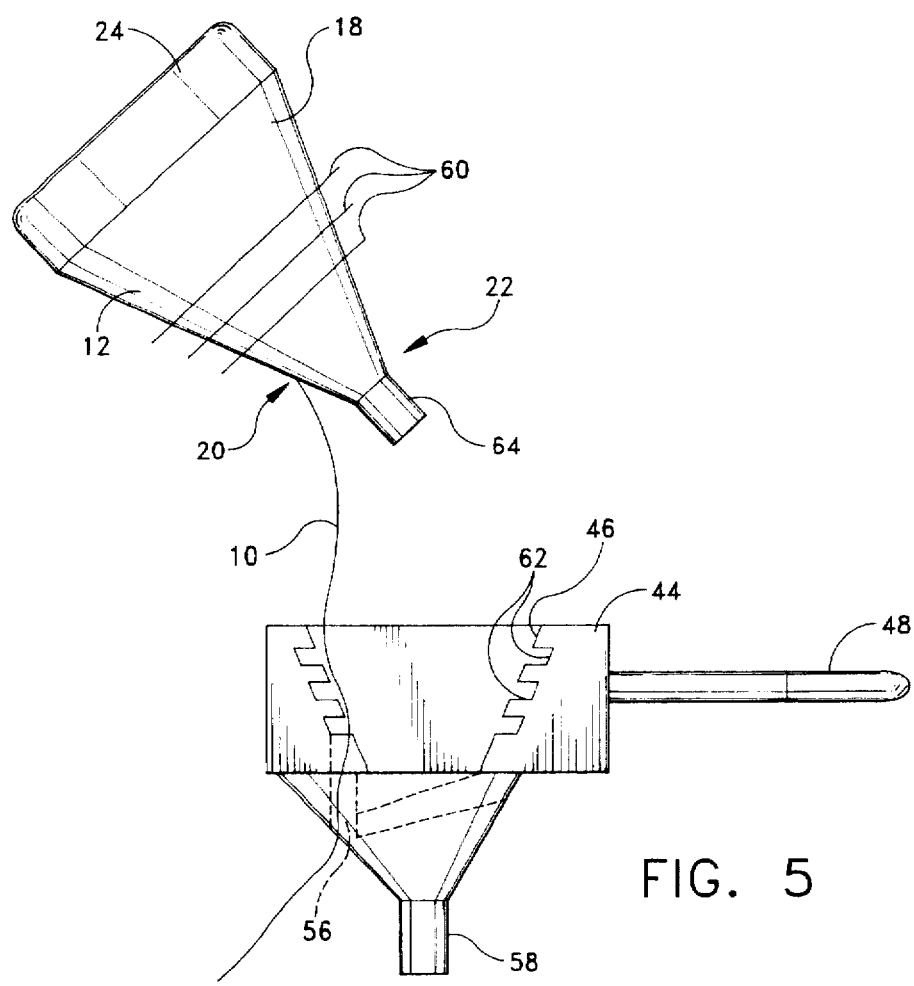
FIG. 5 is a side elevational view of the pod and connector means approaching interconnection.
Figure 6:
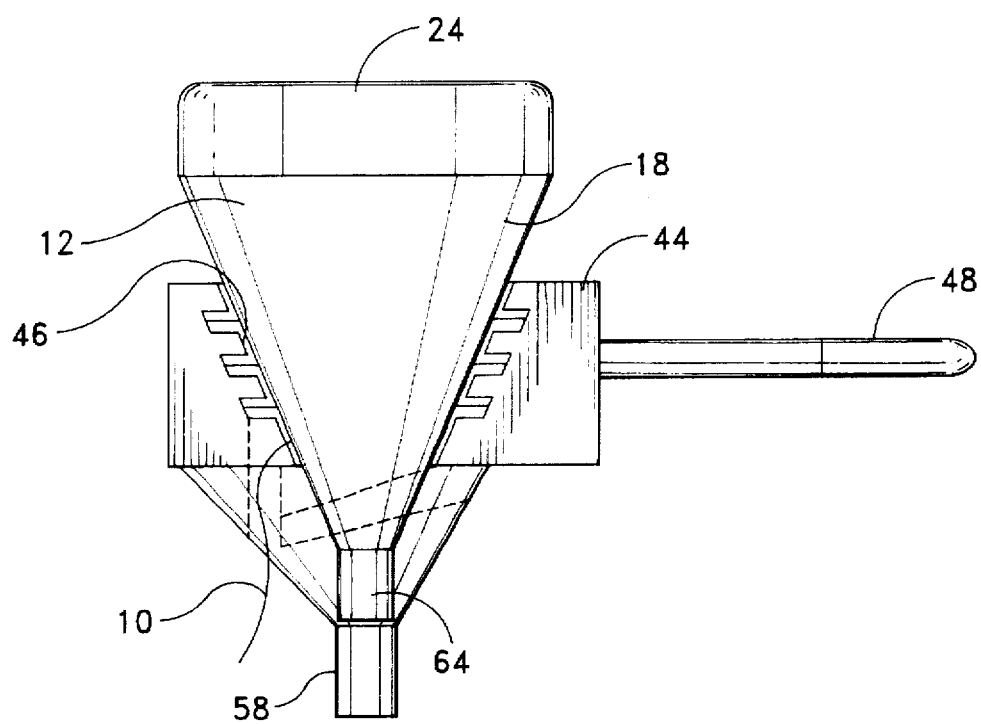
FIG. 6 is similar to FIG. 5, but showing the pod fully nested in the UUV connector means recess.

Referring to the FIG. 5, it will be seen that the hull portion 18 of the pod 12 is provided with a series of annular ribs 60 receivable in grooves 62 in the capture box recess 46. The ribs 60 are of a soft plastic material and are adapted to deform to gain entrance into the grooves 62. At the apex of the pod 12 is a fiber-optic connector 64 which is in communication with the cable 10, the buoy 14, and the distal line and cable 17 and, thereby, the distal station 38. Thus, connection of the capture box fiber-optic connector 58 to the pod fiber-optic connector 64 serves to place the control vessel 34 in communication with the distal station 38. Connectors 58 and 64 have axisymmetrical shapes relative to the conical surface of recess 46 in UUV 30, and to conical hull portion 18 of pod 12, respectively. Connectors 58, 64 are fiber optic connectors that require predetermined angular indexing about their axes in order to mate.

In operation, the UUV 30 homes in on the acoustic beacon 16 such that the UUV collides with the cable 10 which passes through arms 48 and into capture box 44 through opening 52. The UUV 30 continues travelling forwardly, causing the cable 10 to slide through the feed-through channel 56 in the capture box 44, drawing the pod ever closer to the capture box. In due course, the pod 12 approaches the capture box recess 46, as shown in FIG. 5. Continuing further, the pod 12, is forcefully drawn by the cable 10 into the recess 46. The ribs 60 deform against the interior walls of the recess 46 until the ribs reach grooves 62, whereupon ribs 60 snap into grooves 62, to securely anchor pod 12 in recess 46. At this juncture, the pod fiber-optic connector 64 abuts, and is in angularly indexed relationship with the capture box fiber optic connector 58 (about the axis of the mating conical surfaces), thereby placing control vessel 34 in communication with distal station 38. Further, the feed-through channel 56 is disposed in the capture box 44, and the point 20 on the pod 12, at which the cable 10 is affixed to pod 12, is disposed on pod 12 so as to insure engagement of connectors 58, 64 in a preselected azimuth.

It is to be understood that the present invention is by no means limited to the particular constructions herein disclosed and/or shown in the drawings, but also comprises any modifications or equivalents within the scope of the claims.

For example, though the UUV has been illustrated and described as having conical recesses therein adapted to receive a conical portion of a pod, it will be apparent that it is the complementary configurations that are critical and that the recess could well be in the pod and the conical protrusion on the UUV, with the UUV conical protrusion being drawn into the pod conical recess. Further, while the above description is directed in large measure to establishing a communication path between a submarine and a weapon, the control vessel may well be a surface ship, helicopter, or lighter-than-air craft, and the distal station may well be another ship, or the like. Communications links, as above described, are useful in establishing paths of communication under certain circumstances between surface ships, between surface ships and submarines and between submarines and various sensor systems.

What is claimed is:

1. Apparatus for interconnecting an unmanned underwater vehicle and a free-floating communications pod, said apparatus comprising:

a communications c able depending from said pod and extending to a buoy of less buoyancy than said pod, such that said cable is adapted to extend generally vertically in a column of water between said pod and said buoy, said buoy being in communication with a distal station;

a mobile unmanned underwater vehicle having therein guidance means for directing said vehicle to said cable;

communication components disposed in said pod and in said vehicle adapted to abut each other to place said vehicle and said pod in communication with each other;

connector means mounted on a forward-most portion of said vehicle and adapted t o intercept said cable, said connector means being further adapted to permit said cable to slide therethrough as said vehicle continues movement after said intercept of said cable, said connector means comprising only one capture box having only one conically shaped recess therein, said pod having a conically shaped portion, said capture box recess being adapted to receive said pod portion forward of said forward-most portion of said vehicle upon engagement of said vehicle capture box with said pod, said capture box being provided with a forward facing opening adapted to receive said cable upon the intercept of said cable and a slot extending from said opening through said recess to a cable feed-through channel disposed at least in part astern of said recess wherein said cable is permitted said sliding movement through said box, said slot extending around an apex of said conical recess to said disposition astern of said recess, said channel being spaced from said apex; and complementary alignment means on said vehicle capture box and said pod adapted to cause the vehicle capture box to engage the pod in a preselected orientation and azimuth to align said communication components of said vehicle capture box with said communication components of said pod;

whereby said vehicle is placed in communication with said pod.

2. The apparatus in accordance with claim 1 further comprising:

a beacon disposed in said cable adapted to emit a signal for guiding said vehicle to said cable; and said guidance means is operative to home on said beacon.

3. The apparatus in accordance with claim 1 wherein said cable is adapted to carry communication signals between said pod and said buoy and is thereby adapted to place said vehicle in communication with said distal station.

4. The apparatus in accordance with claim 3 wherein said vehicle is in communication with a control vessel, whereby said control vessel is placed in communication with said distal station.

5. The apparatus in accordance with claim 1 wherein said cable is affixed to said pod at a point on said pod removed from an apex of said conical portion of said pod.

6. The apparatus in accordance with claim 5 wherein a first communication connector is fixed at said apex of said vehicle recess and a second communication connector is fixed at said apex of said pod conical portion, said first connector being adapted to engage said second connector upon nesting of said pod conical portion in said box recess.

7. Apparatus for interconnecting an unmanned underwater vehicle and a free-floating communications pod, said apparatus comprising:

a communications cable depending from said pod and extending to a buoy of less buoyancy than said pod, such that said cable is adapted to extend generally vertically in a column of water between said Dod and said buoy, said buoy being in communication with a distal station;

a mobile unmanned underwater vehicle having therein guidance means for directing said vehicle to said cable;

communication components disposed in said pod and in said vehicle adapted to abut each other to place said vehicle and said pod in communication with each other;

connector means mounted in a nose portion of said vehicle and adapted to intercept said cable, said connector means being further adapted to permit said cable to slide therethrough as said vehicle continues movement after said intercept of said cable, said connector means comprising a capture box having a conically shaped recess therein, said pod having a conically shaped portion, said capture box recess being adapted to receive said pod portion upon engagement of said vehicle with said pod said capture box being provided with an opening adapted to receive said cable upon the intercept of said cable and a slot extending through said recess to a cable feed-through channel wherein said cable is permitted said sliding movement through said box, said slot extending around an apex of said conical recess, said channel being spaced from said apex, wherein said capture box is provided with groove means and said pod is provided with rib means, said groove means being adapted to receive and retain said rib means to secure said pod in said box, wherein said rib means are deformable to enter said groove means, and wherein said groove means comprises an annular groove and said rib means comprises a circular rib; and complementary alignment means on said vehicle and said pod adapted to cause the vehicle to engage the pod in a preselected orientation and azimuth to align said communication components of said vehicle with said communication components of said pod;

whereby said vehicle is placed in communication with said pod.

8. The apparatus in accordance with claim 6 wherein said communication cable includes fiber optic communication means, said buoy is in fiberoptic communication with said distal station, said vehicle is in fiberoptic communication with said control vessel, and said first and second connectors are fiber optic connectors.

9. The apparatus in accordance with claim 6 wherein said feed-through channel is disposed in said capture box and said point on said pod at which said cable is affixed to said pod is disposed on said pod so as to insure said engagement of said first and second connectors in said- preselected azimuth.

10. The apparatus in accordance with claim 1 wherein arms extend forwardly and divergently from said capture box to define a funnel-like entrance into said capture box opening, to facilitate the intercept of said cable.

11. Apparatus for interconnecting a control vessel and an underwater distal station, said apparatus comprising:

a free-floating pod;

a communications cable depending from said pod and extending to a buoy of less buoyancy than said pod, such that said cable is adapted to carry communications signals between said pod and said buoy and extends generally vertically in a column of water between said pod and said buoy, said buoy being in communication with the distal station;

a mobile unmanned underwater vehicle having therein guidance means for directing said vehicle to said cable;

communication components disposed in said pod and in said vehicle adapted to abut each other to place said vehicle and said pod in communication with each other;

a control vessel in communication with said vehicle;

connector means mounted on a forward-most portion of said vehicle and adapted to intercept said cable, said connector means being further adapted to permit said cable to slide therethrough as said vehicle continues movement after said intercept of said cable, said connector means comprising only one capture box having only one conically shaped recess therein, said pod having a conically shaped portion, said capture box recess being adapted to receive said pod portion forward of said forward-most portion of said vehicle upon engagement of said vehicle with said pod, said capture box being provided with a forward-facing opening adapted to receive said cable upon the intercept of said cable and a slot extending from said opening through said recess to a cable feed-through channel disposed at least in part astern of said recess wherein said cable is permitted said sliding movement through said box, said slot extending around an apex of said conical recess to said disposition astern of said recess, said channel being spaced from said apex; and complementary alignment means on said vehicle capture box and said pod adapted to cause the vehicle capture box to engage said pod in a preselected orientation and azimuth to align said communication components of said vehicle capture box and said pod;

whereby said control vessel is placed in communication with said distal station.

12. The apparatus in accordance with claim 11 wherein said cable is affixed to said pod at a point on said pod removed from an apex of said conical portion of said pod.

13. The apparatus in accordance with claim 12 wherein a first communication connector is fixed at said apex of said vehicle recess and a second communication connector is fixed at said apex of said pod conical portion, said first connector being adapted to engage said second connector upon nesting of said pod conical portion in said box recess.

14. The apparatus in accordance with claim 13 wherein said feed-through channel is disposed in said capture box and said point on said pod at which said cable is affixed to said pod is disposed on said pod so as to insure said engagement of said first and second connectors in said preselected azimuth.

15. The apparatus in accordance with claim 1 further comprising locking means for locking said pod in engagement with said vehicle.

16. The apparatus in accordance with claim 15 wherein said locking means comprises a groove defined by one of said pod and said capture box and a rib extending from the other of said pod and said capture box, said groove being adapted to receive and retain said rib to secure said pod in said box.

17. The apparatus in accordance with claim 16 wherein said rib is deformable to enter said groove.

18. The apparatus in accordance with claim 17 wherein said groove is of annular configuration and said rib is of circular configuration.

* * * * *